Jan. 18, 1955     F. G. FERGUSON     2,699,810
TOOL
Filed Nov. 27, 1953

INVENTOR.
FORREST G. FERGUSON,
BY
McMorrow, Berman & Davidson
ATTORNEYS.

United States Patent Office 2,699,810
Patented Jan. 18, 1955

2,699,810

TOOL

Forrest G. Ferguson, Osawatomie, Kans.

Application November 27, 1953, Serial No. 394,748

1 Claim. (Cl. 152—330)

This invention relates to tools, and more particularly to a tool employed in connection with the repairing of tractor tires.

In connection with the repairing of tractor tires, it is a frequent occurence to have a tire for repair that is still on the rim, and where the valve stem has been broken off, leaving the tube inside of the rim. Tires on farm and construction tractors are frequently filled with liquid for the purpose of insuring greater traction for the vehicle, and in such cases, it is desirable to save as much of the liquid as possible, since the liquid is normally of an anti-freeze nature, hence, rather costly.

It is, therefore, the primary object of this invention to provide a tool which may be quickly and easily applied to the rim, permitting the fluid to be recovered from the tire in which the valve stem has been broken off.

Heretofore, attempts have been made to recover the fluid from the tire in which the valve stem has been broken off by inserting copper tubing through the valve stem hole in the rim. This is a very difficult process, since the copper tubing must be forced through the valve stem hole in the rim and is, consequently, a time consuming operation, and experience has shown that a great deal of the liquid is not recovered. It is, therefore, another object of this invention to provide a tool which may be applied to the valve stem hole in the rim with very little difficulty and will insure the recovery of substantially all of the liquid in the tire.

Other objects and advantages will become apparent from the following detailed description, forming the specification, and taken in conjunction with the accompanying drawings, in which.

Figure 1:
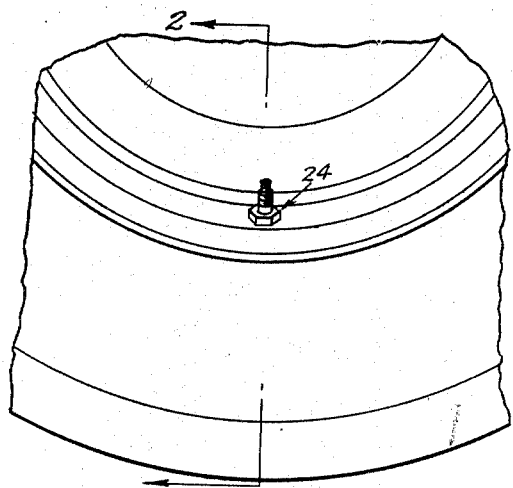
Figure 1 is a side elevational view of a tractor tire mounted on a rim, with the tool embodying the present invention applied thereto.
Figure 2:
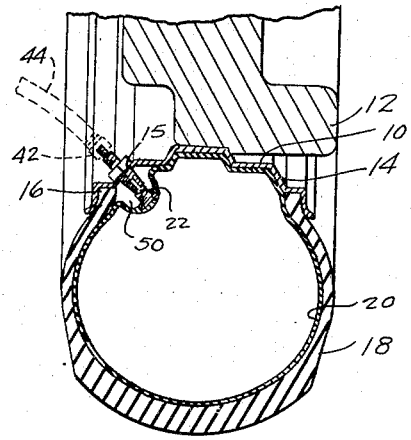
Figure 2 is a cross sectional view taken on line 2—2 of Figure 1.
Figure 3:
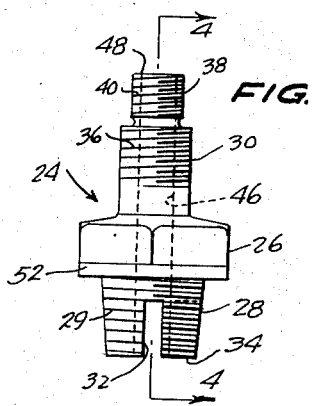
Figure 3 is a side elevational view of the tool of the present invention.
Figure 4:
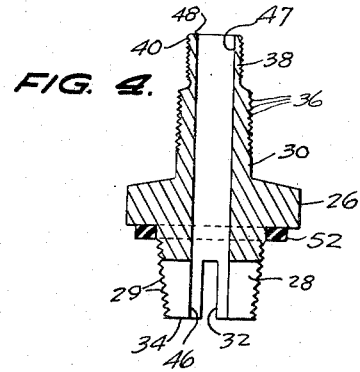
Figure 4 is a vertical cross sectional view taken on line 4—4 of Figure 3.
Figure 5:
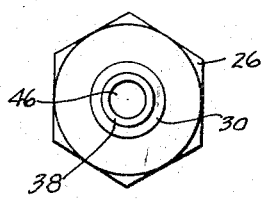
Figure 5 is a top plan view of the tool shown in Figure 3.
Figure 6:
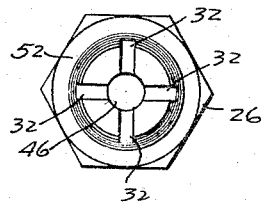
Figure 6 is a bottom plan view thereof.

With continued reference to the drawings, there is shown a rim 10 of a tractor wheel 12, the rim 10 being provided with the usual valve stem hole normally found in that portion of the rim 14 directly adjacent to the valve flange which holds the bead 16 of the tire 18. The tire 18 is provided with the usual inner tube 20 which is housed within the tire annulus and in the present case, has been inflated with a fluid. The practice of inflating tractor tires, or more specifically, the tubes housed within the tires, with a fluid is common on tractors where the additional weight of the liquid contained within the tires affords greater traction for the tractor. However, since many of these tractors operate under weather conditions which include below freezing temperatures, the liquid pumped into the tire must be of an anti-freeze type. Hence, the cost of such liquid is rather high, and where, as in the present case, the valve stem 22 has been broken off and no longer projects through the valve stem opening 15 of the rim 10, it becomes a laborious and difficult operation to recover the expensive liquid with which the tires were inflated.

In order to expedite the recovery of the liquid in the tire 18, in the case where the valve stem 22 has been broken off, a one-piece or integral tool, generally indicated at 24, embodying this invention, has been provided. The tool 24 comprises a body 26 in the form of a hexagonal nut, a plug 28 carried by the body 26 and extending outwardly therefrom at one end thereof, and a threaded shank 30 extending outwardly from the other end of the body 26 remote from the end thereof upon which the plug 28 is carried.

The plug 28 is generally cylindrical in form, having tapering sides, which is provided with external threads of the self-tapping type. The plug 28 is further provided with a plurality of slots 32 which extend transversely therethrough and open to one end 34 thereof, the slots 32 extending from a location of the plug 28 between the end 34 and the body 26 and opening to the end 34 which is remote from the body 26. The shank 30 is generally cylindrical in form and extends centrally from the end of the body 26 remote from the plug 28 and is provided with external threads 36. The top portion 38, or that portion of the shank 30 remote from the body 26, is of reduced diameter, or of a diameter of lesser dimension than the remaining portion of the shank 30. The portion 38 is provided with standard external threads 40, both sets of standard threads 36 and 40 being the same as those used on a tractor tire valve stem, such as the valve stem 22, and are designed to threadingly engage with the standard pump hose connectors, such as the connector 42 of the pump hose 44. A central bore 46 extends centrally through the body 26, the plug 28 and the shank 30 and its top portion 38, so that the bore 46 extends continually and centrally through the entire tool 24 and opens to the end 34 of the plug 28 and to the end 48 of the top portion 38 of the shank 30. The body 26 and the plug 28, and shank 30 carried thereby, are preferably formed as one piece.

In using the tool 24, in the event the valve stem 22 has been broken off, so as to permit recovery of the liquid within the tire 18, the plug 28 is threaded into the valve stem opening 15 in the rim 10. Normally, the valve stem opening of the wheel rim is not threaded, however, the threads 29 are of the self-threading type, so that upon turning the plug 28 in the valve stem opening 15, suitable threads will be formed, whereby the tool 24 will be threadingly received in the valve stem opening 15. As the valve stem opening 15 is penetrated by the plug 28, the end 34 of the plug will engage the side of the inner tube 22, normally adjacent to the broken valve stem 22, and space the tube 20 from the interior of the casing of the tire 18, so as to form a pocket 50 into which the liquid contained in the tire 18 and tube 20 may flow. At this point, it should be noted that a washer 52 encircles the plug 28 and is in abutting relation with the adjacent surface of the body 26. So that as the body 26 is turned so as to threadingly insert the plug 28 into the valve stem opening 15 to its fullest extent, the washer 52, preferably made of rubber, will seal the opening 15. The liquid in the tube 20 will flow through the broken valve stem 22 into the pocket 50 and enter the bore 46 through the slots 32 and be drawn out through the bore and into the hose 44 which has been coupled to the shank or stem 30 by the connector 42. The hose 44 is the withdrawal conduit of a liquid pump (not shown).

Thus, it will be apparent that the application of the present tool 44 will effect substantial recovery of the liquid employed to inflate the tire 18, and the liquid may be subsequently used in the same tire after suitable repairs have been made.

From the foregoing, it will be apparent that there has been provided a tool for use in recovering liquid from a tire and tube mounted on a wheel rim which has a valve stem opening therein and in which the tube valve stem has been broken off, the tool comprises a body, a plug having external self-tapping threads carried by the body and adapted to be threadingly inserted into the valve stem opening in the rim to bear against the tube, thereby defining a pocket between the tube 20 and the tire 18 into which the fluid contained in the tube may flow, the body and the plug having a bore therethough and through which bore the liquid may be withdrawn from the tube and thus be recovered for further use.

Also, the externally threaded shank or stem 30, which is carried by the body at the end thereof remote from the plug 28, has a bore therethrough, indicated at 47, which forms a continuation of the bore 46 through the body, plug and the shank, the bore 46, including the extension thereof 47, opens to the respective ends 34 and 48 of the tool 24.

While there is shown and described the preferred embodiment of the invention, it is to be understood that the structure is susceptible to change and modification within the practicability of the invention and, therefore, should be limited only to the scope of the claims appended hereto.

What is claimed is:

In combination with a tire and tube filled with a liquid and having a valve stem mounted on a wheel rim provided with an opening through which the valve stem extends; an integral tool for recovering liquid from the tire and tube when the tube valve stem is broken comprising a body, a plug carried by said body, said plug threadingly inserted into the valve stem opening in said rim to bear against said tube to define a pocket between said tube and said tire and rim into which liquid from said tube may flow, said body and said plug having a bore therethrough and through which bore said liquid may be withdrawn, said plug having transverse slots formed in the walls thereof opening to the end thereof remote from said body and in communication with the said bore so that said liquid may flow from the pocket through said slots and into said bore.

References Cited in the file of this patent

UNITED STATES PATENTS

| | | |
|---|---|---|
| 2,307,429 | Steidinger | Jan. 5, 1943 |
| 2,339,381 | Crowley | Jan. 18, 1944 |
| 2,621,700 | Snyder | Dec. 16, 1952 |